R. A. MILNE.
AUTOMATIC FORCE FEED LUBRICATOR.
APPLICATION FILED MAY 26, 1915.

1,170,089.

Patented Feb. 1, 1916.
2 SHEETS—SHEET 1.

WITNESSES:
L. S. Woodhull
M. E. Broesamle

INVENTOR
Russell A. Milne.
BY
ATTORNEY

R. A. MILNE.
AUTOMATIC FORCE FEED LUBRICATOR.
APPLICATION FILED MAY 26, 1915.

1,170,089.

Patented Feb. 1, 1916.
2 SHEETS—SHEET 2.

WITNESSES:
L. S. Woodhull
M. E. Brocamble

INVENTOR
Russell A. Milne.
BY
ATTORNEY

UNITED STATES PATENT OFFICE.

RUSSELL A. MILNE, OF DETROIT, MICHIGAN, ASSIGNOR TO SNYDER MANUFACTURING COMPANY, A COPARTNERSHIP COMPRISING RUSSELL A. MILNE, CHARLES M. SNYDER, AND CHARLES WESTFALL, ALL OF DETROIT, MICHIGAN.

AUTOMATIC FORCE-FEED LUBRICATOR.

1,170,089.   Specification of Letters Patent.   Patented Feb. 1, 1916.

Application filed May 26, 1915. Serial No. 30,481.

*To all whom it may concern:*

Be it known that I, RUSSELL A. MILNE, a citizen of the United States, residing at Detroit, in the county of Wayne, State of Michigan, have invented certain new and useful Improvements in Automatic Force-Feed Lubricators; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to lubricators especially adapted for delivering grease or non-fluid lubricant to journal bearings, and consists in the novel construction and arrangement of parts as hereinafter set forth and claimed.

The invention has for its object the provision of simple and efficient means for force-feeding grease or non-fluid oil to the bearings of rotative shafts in such manner as to provide a positive feed for the lubricant under sufficient pressure to insure a constant and uniform flow to the bearings, and in which the rotary movement of the shaft is utilized as the driving means in connection with actuating means adjustable for controlling the delivery of the lubricant under a given pressure, and which will automatically maintain the feed at the desired or predetermined pressure.

Figure 1:
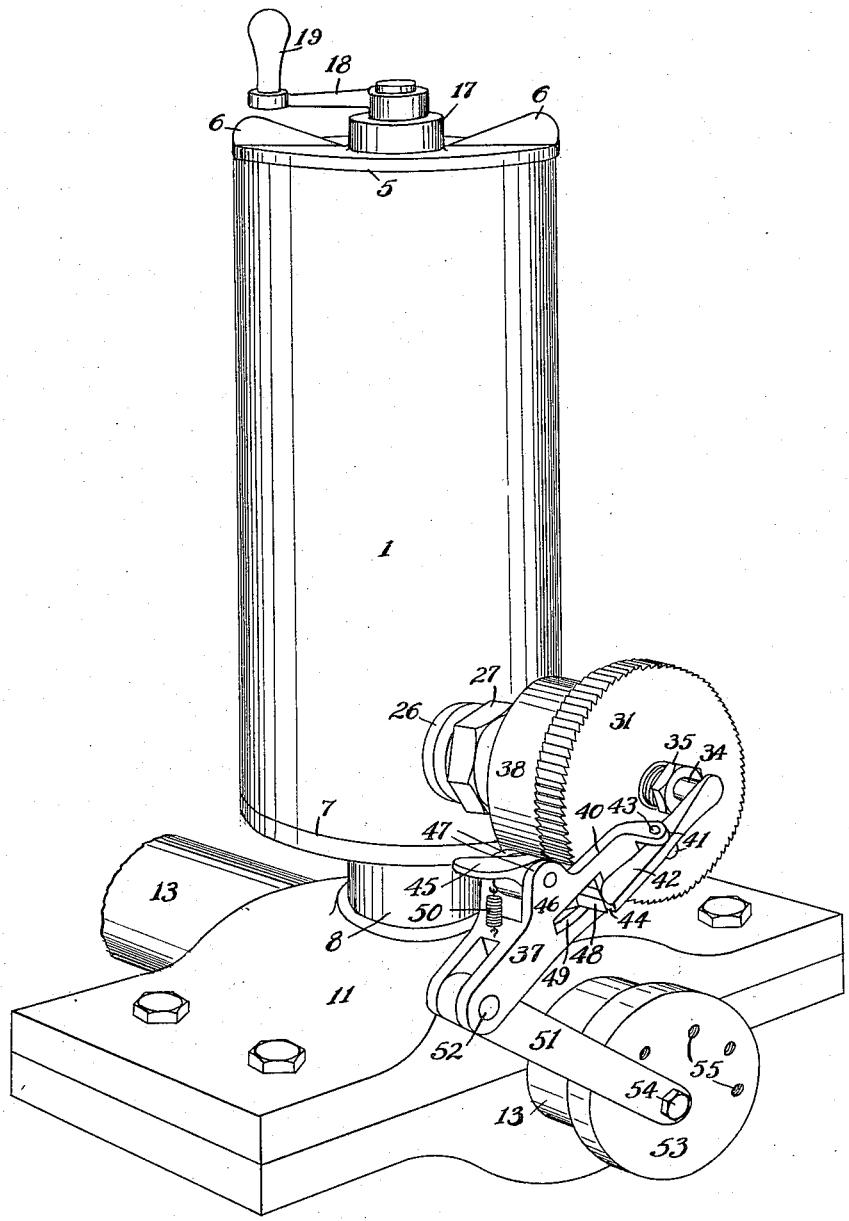
Figure 3:
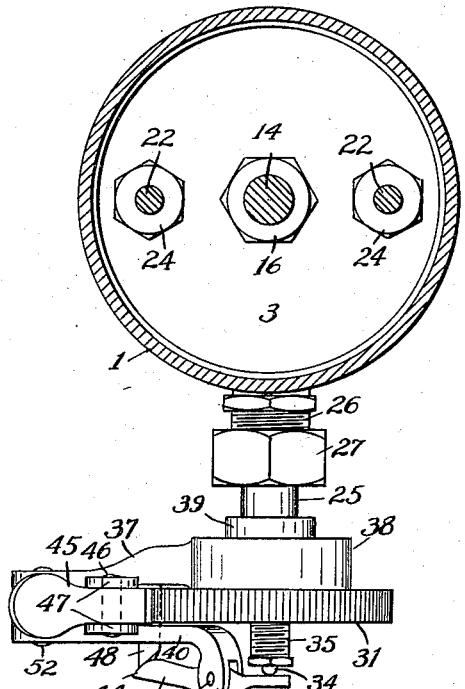
Figure 2:
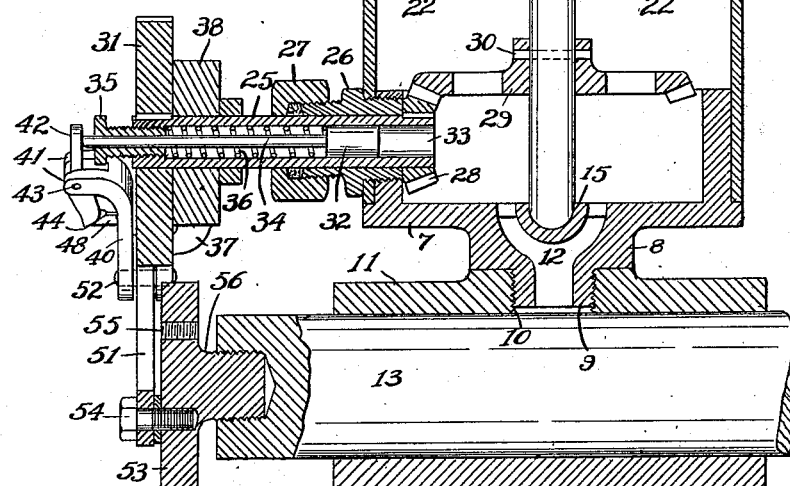

The preferred form of embodiment of the present invention by which the above object is attained is illustrated in the accompanying drawings, in which, Figure 1 is a perspective view of the device showing it in connection with a shaft and journal bearing as it would appear in position for operation. Fig. 2 is a central vertical sectional view showing the interior arrangement of the parts of the device shown in Fig. 1. Fig. 3 is a transverse sectional elevation taken on dashed line 3—3 of Fig. 2.

Referring to the parts of the device by the characters of reference marked on the drawings throughout the several views, 1 designates a cylindrical receptacle or container for the lubricant to be fed, and which is interiorly screw-threaded intermediate its ends, as at 2, for the reception of a screw-threaded rotative pressure disk or plunger 3 for compressing the lubricant. The upper end of the cylinder 1 is interiorly screw-threaded as at 4 for the reception of a detachable screw-threaded cap or plug 5 having projecting ears or wings 6 by which it may be turned to screw it into and out of said cylinder. The lower end of the cylinder is closed by a flanged head 7 securely seated therein, and which is provided with a central boss 8 having a stem 9 screw-threaded for reception in a threaded aperture 10 formed through the wall of a journal bearing box 11, by means of which said cylinder is supported in a vertical position thereon. A branched passage 12 extending through the boss 8 and communicating with the interior of the cylinder forms a discharge outlet for the lubricant to the rotative shaft 13 to be lubricated.

A vertical shaft 14 is supported at its lower end in a bearing 15 abridging the passage 12 in the head 7, and extending through a stuffing box 16 mounted centrally in the plunger 3 said shaft passes through a boss 17 formed centrally on the plug 5 and has secured to its upper end a crank-arm 18 having a handle 19 by which said shaft may be manually rotated. Secured rigidly to the upper end of the shaft 14 by a key or pin 20 is a cross-head 21 which abuts against the inner end of the boss 17 of the plug 5 and serves as a stop to limit the upward axial movement of said shaft, and depending from the ends of said cross-head parallel to and equidistant upon opposite sides of this shaft are driving stems 22, each of which is secured at one end in said cross-head by a pin 23, or otherwise fixedly connected, and is slidably extended through a stuffing-box bushing 24 threaded into the rotative plunger 3. By this means a slidable driving connection is effected between said shaft and plunger by which said plunger is caused to rotate with the shaft and is permitted to move axially thereon in following the lead of the screw threads 2 of the cylinder in which it is forced to travel longitudinally in one direction to exert pressure upon the lubricant and in the reverse direction for withdrawal to permit the replenishing of the cylinder with lubricant. The close working fit afforded by the screw-threaded engagement of the plunger and cylinder, together with that of the stuffing boxes embracing the shaft and driving stems, prevents the escape of the lubricant from the cylinder when under pressure of the plunger head except through the delivery passage 12.

The shaft 14 is driven mechanically and in a manner to automatically control and maintain a given pressure upon the lubricant by the following mechanism: A tubular shaft 25 is extended laterally through the side wall of the cylinder at its lower end and is journaled to rotate in a bearing sleeve 26 which is threaded through said wall and through the engaging flange of the head 7, and is provided at its outer end with a packing nut 27 embracing said shaft to effect a tight working bearing and prevent leakage of the lubricant therethrough.

Mounted rigidly on the inner end of the tubular shaft 25 is a beveled pinion 28 which meshes with a beveled gear 29 that is keyed or pinned as at 30 to the shaft 14, and fixedly secured to the outer end of said tubular shaft is a ratchet toothed disk 31. A piston head 32 is fitted to slide in the bore 33 of the tubular shaft and is provided with a stem 34 which extends through an adjustable screw plug 35 threaded into the outer end of said shaft, and embracing said stem and interposed between said plug and piston head is a coiled spring 36 for exerting a yielding pressure upon the piston against the pressure of the lubricant entering the bore 33 from the cylinder 1.

An intermittent rotative movement is imparted to the ratchet disk 31 by means of an arm or lever 37, one end of which is forked to receive said disk and one of said forks is formed with a collar 38 which embraces the shaft 25 between the inner face of said disk and a stop collar 39 secured to said shaft, upon which said lever is pivoted to swing. The outer fork 40 of the lever 37 terminates in a pair of outwardly turned ears 41, between which a lever 42 is pivoted upon a pintle 43. Said lever engages upon its inner face at its outer end with the outer end of the stem 34 and is shaped at its opposite end to form a cam bearing surface 44. Carried in the fork of the lever 37, so as to engage at one end with the teeth of the ratchet disk 31, is a ratchet pawl 45 which is pivoted to swing upon a pintle 46 extended through projecting ears 47 formed on said lever. The engaging end of the ratchet pawl is formed with a laterally projecting shoulder 48 which extends through an elongated aperture 49 formed through the fork 40, said shoulder being beveled at its outer end to form an inclined bearing surface with which the cam end of the lever 42 is adapted to slidably contact to force said pawl out of operative engagement with the teeth of the ratchet disk with which it is normally held engaged by the tension of a coiled spring 50 attached at one end to the outer end of said pawl and at its opposite end to said forked lever. The swinging end of the forked lever is bifurcated and receives one end of a connecting rod 51 to which it is pivoted by a pin 52. The other end of this rod is pivotally connected eccentrically to the face of a disk 53 by means of a screw stud 54, which is adapted for reception selectively in any of a series of threaded apertures 55 formed therein at varying intervals of radii eccentric to the axis of said disk to provide for regulating the throw imparted by the connecting rod to the ratchet lever through the rotation of said disk, which latter may be fixedly attached concentrically to the rotative shaft 13 by screw-threaded engagement with a stud 56 on said disk, or otherwise suitably secured to rotate therewith.

The parts being thus constructed and arranged the operation of the device will be as follows: The lubricant which is contained in the cylinder between the screw plunger and the end of said cylinder connected to the bearing to be lubricated will be subjected to pressure as said plunger is screwed downwardly through its slidable driving connection with the stems 22 of the cross-head 21 of the shaft 14 as said shaft is rotated through the driving engagement of its gear 29 with the pinion 28 of the tubular shaft 25. To this shaft intermittent partial rotations are transmitted through the successive engagement of the ratchet pawl 45 with the teeth of the ratchet disk 31 by the oscillating movement imparted to the lever 37 through the reciprocation of the connecting rod 51 actuated by the crank stud 54 of the disk 53 rotating with the shaft 13. The lubricant is thus compressed and caused to feed through the passage 12 to the journal bearing 11, and is also forced into the bore 33 of the tubular shaft 25 against the piston 32 and its spring 36 therein. Should the pressure on the lubricant increase, through too rapid a movement of the plunger, sufficiently to overcome the tension of the spring 36 the piston will be forced axially causing its stem 34 to swing the lever 42 carrying its cam end 44 against the inclined shoulder 48 of the ratchet pawl 47 to disengage said pawl from the teeth of the ratchet disk 31, and thus interrupt the transmission of motion to drive the plunger. When the pressure recedes through the discharge of the lubricant to the journal bearing, the spring 36 will return the plunger, releasing its stem from the lever 42 engaging the shoulder 48 of the ratchet pawl, when said pawl will be returned to engagement with the ratchet disk by the tension of the spring 50, and the driving connection with the plunger will be restored. When the plunger shaft reaches the limit of its travel in the screw-threads of the cylinder, it will pass out of engagement with the threads and will remain inoperative until again restored. This may be accomplished by unscrewing the cap 5 sufficiently to raise the shaft and disengage its gear from the pinion, when, by rotating the shaft in the reverse direction by means of its crank-arm 18, the plunger will be carried upwardly and out of engagement with the threads of the cylinder at its upper end. The cap may then be completely removed together with the shaft, cross-head and plunger, and the cylinder may be refilled with lubricant and the parts replaced for further operation as before described.

It will be noted that by regulating the tension on the spring 36, through adjustment of the screw plug 35 in the tubular shaft 25, that the desired pressure under which the lubricant is to be delivered may be readily regulated and will thereafter be automatically controlled and maintained at the predetermined degree of pressure.

I claim:

1. In a lubricator, a cylinder for containing the lubricant having a delivery outlet, a plunger movable longitudinally in said cylinder for exerting pressure on said lubricant to eject it through said outlet, power transmitting means having detachable driving connection with said plunger for imparting movement thereto, and means associated with said cylinder and with said power transmitting means and actuable by the pressure of the lubricant for disengaging said driving connection.

2. In a lubricator, a cylinder for containing the lubricant having a delivery outlet, a rotatable plunger having screw-threaded engagement within said cylinder and movable therein for exerting pressure on the lubricant to eject it through said outlet, power transmitting means having detachable driving connection with said plunger for imparting rotary motion thereto, and means operatively engaging said driving connection and communicating with said cylinder actuable by the pressure of the lubricant therein for disengaging said driving connection.

3. In a lubricator, a cylinder for containing the lubricant having a delivery outlet adapted for connection with a journal bearing, a plunger movable longitudinally in said cylinder for exerting pressure on the lubricant to eject it through said outlet, power transmitting means having detachable driving connection with said plunger, means operatively engaging said driving connection and associated with said cylinder actuable by the pressure of the lubricant therein for disengaging said driving connection, and means for limiting the longitudinal travel of said plunger.

4. In a lubricator, a cylinder for containing the lubricant having a delivery outlet adapted for connection with the journal bearing, a rotatable plunger having screw-threaded engagement with said cylinder and movable longitudinally therein for exerting pressure on the lubricant to eject it through said outlet, power transmitting means having detachable driving connection with said plunger for imparting rotary movement thereto to move said plunger longitudinally of said cylinder, means operatively engaging said driving connection and communicating with said cylinder actuable by the pressure of the lubricant therein for disengaging said driving connection, and adjustable means for regulating the pressure on the lubricant and for restoring said driving connection.

5. In a lubricator, a cylinder for containing the lubricant having a delivery outlet, a plunger movable longitudinally in said cylinder for exerting pressure on the lubricant to eject it through said outlet, power transmitting means having detachable driving connection with said plunger, and spring pressed means associated with said cylinder and with said power transmitting means actuable by the pressure of the lubricant for disengaging said driving connection and actuable with the decreasing pressure on the lubricant for restoring said driving connection.

6. In a lubricator, a cylinder for containing the lubricant having a delivery outlet, a rotatable plunger having screw-threaded engagement within said cylinder and movable longitudinally therein for exerting pressure on the lubricant to eject it through said outlet, power transmitting means having detachable driving connection with said plunger for imparting rotary motion thereto to move the plunger longitudinally of said cylinder, means operatively engaging said driving connection and communicating with said cylinder actuable by the pressure of the lubricant therein for disengaging said driving connection and actuable against the pressure of the lubricant for restoring said driving connection, and means for limiting the longitudinal travel of said plunger in said cylinder.

7. In a lubricator, in combination with a journal bearing having a drive shaft, a cylinder for containing the lubricant having a delivery outlet adapted for attachment to said journal bearing, a rotatable plunger having screw-threaded engagement within said cylinder and movable therein for exerting pressure upon the lubricant to eject it through said outlet, power transmitting means connecting said plunger with said drive shaft and carrying disengageable driving means for transmitting rotary motion to said plunger to move it longitudinally of said cylinder and compress the lubricant therein, a tubular member communicating with the lubricant and carrying a spring pressed plunger engaging said driving means, whereby said plunger is actuable in one direction by the pressure of the lubricant for disengaging said driving means and in the opposite direction by the pressure of its spring for releasing said driving means to restore the driving connection.

8. In a lubricator, in combination with a journal bearing having a drive shaft, a cylinder for containing the lubricant having a delivery outlet adapted for connection with said journal bearing, a driven shaft journaled to rotate in said cylinder, a plunger slidably embracing said shaft and having screw-threaded engagement for longitudinal movement within said cylinder, driving means carried by said driven shaft and slidably engaging said plunger for imparting rotary motion thereto through the rotation of said shaft, a counter shaft journaled to rotate in said cylinder in driving connection with said driven shaft and carrying a ratchet disk thereon, a ratchet lever carrying a spring tensioned pawl in engagement with said ratchet disk mounted to swing on said tubular shaft, and means connecting said lever with said drive shaft for imparting a swinging motion to actuate said ratchet pawl and transmit movement to said disk.

9. In a lubricator, in combination with a journal bearing having a drive shaft, a cylinder for containing the lubricant having a delivery outlet adapted for connection with said journal bearing, a driven shaft journaled to rotate in said cylinder, a plunger slidably embracing said shaft and having screw-threaded engagement for longitudinal movement within said cylinder, driving means carried by said driven shaft and slidably engaging said plunger for imparting rotary motion thereto through the rotation of said shaft, a tubular counter shaft journaled to rotate in said cylinder in driving connection with said driven shaft and carrying a ratchet disk thereon, a ratchet lever carrying a spring tensioned pawl in engagement with said ratchet disk mounted to swing on said tubular shaft, means connecting said lever eccentrically with said drive shaft for imparting a swinging motion to actuate said ratchet pawl and transmit movement to said disk, a spring pressed piston mounted to reciprocate in said tubular shaft, and a cam lever pivotally carried on said ratchet lever in engagement with said piston and pawl and adapted to be actuated to disengage said pawl from said ratchet disk through movement of said piston by the pressure of the lubricant.

In testimony whereof, I sign this specification.

RUSSELL A. MILNE.

Copies of this patent may be obtained for five cents each, by addressing the "Commissioner of Patents, Washington, D. C."